US008515467B2

(12) United States Patent
Liu et al.

(10) Patent No.: US 8,515,467 B2
(45) Date of Patent: Aug. 20, 2013

(54) ADAPTER FOR SYNCHRONIZING DATA OVER DIFFERENT NETWORKS (75) Inventors: Ming Liu, Redmond, WA (US); Paresh Suthar, Redmond, WA (US); Nigel Snoad, Brooklyn, NY (US)

(73) Assignee: Microsoft Corporation, Redmond, WA (US)

( * ) Notice: Subject to any disclaimer, the term of this patent is extended or adjusted under 35 U.S.C. 154(b) by 650 days.

(21) Appl. No.: 12/145,509

(22) Filed: Jun. 25, 2008

(65) Prior Publication Data
US 2009/0325610 A1 Dec. 31, 2009

(51) Int. Cl.
*H04W 4/12* (2009.01)

(52) U.S. Cl.
USPC ............ 455/466; 370/352; 370/401; 370/466

(58) Field of Classification Search
USPC ................. 455/466; 370/328–352, 389–392, 370/401, 466
See application file for complete search history.

(56) References Cited

U.S. PATENT DOCUMENTS

| | | | | |
|---|---|---|---|---|
| 6,246,688 | B1 * | 6/2001 | Angwin et al. | 370/401 |
| 6,424,841 | B1 | 7/2002 | Gustafsson | |
| 6,718,178 | B1 * | 4/2004 | Sladek et al. | 455/466 |
| 6,961,330 | B1 * | 11/2005 | Cattan et al. | 370/352 |
| 7,020,479 | B2 | 3/2006 | Martschitsch | |
| 7,110,776 | B2 | 9/2006 | Sambin | |
| 7,376,091 | B1 * | 5/2008 | Eccles et al. | 370/265 |
| 2002/0087408 | A1 * | 7/2002 | Burnett | 705/14 |
| 2004/0008656 | A1 * | 1/2004 | Qu et al. | 370/342 |
| 2004/0185883 | A1 | 9/2004 | Rukman | |
| 2005/0037741 | A1 | 2/2005 | Gilbert | |
| 2005/0259652 | A1 * | 11/2005 | Tang et al. | 370/389 |
| 2005/0265525 | A1 * | 12/2005 | Tang et al. | 379/88.13 |
| 2006/0155698 | A1 | 7/2006 | Vayssiere | |
| 2006/0165105 | A1 | 7/2006 | Shenfield et al. | |
| 2006/0234734 | A1 * | 10/2006 | Kim | 455/466 |
| 2007/0105528 | A1 | 5/2007 | Haas et al. | |
| 2007/0116223 | A1 * | 5/2007 | Burke et al. | 379/201.12 |
| 2007/0116248 | A1 | 5/2007 | Samama | |
| 2007/0162165 | A1 | 7/2007 | Stirbu et al. | |
| 2007/0191032 | A1 | 8/2007 | Doffman | |

(Continued)

FOREIGN PATENT DOCUMENTS

| | | |
|---|---|---|
| CN | 101043658 A | 9/2007 |
| JP | 2000-99384 | 4/2000 |

(Continued)

OTHER PUBLICATIONS

"SMS messages and the PDU format" http://web.archive.org/web/20070623030455/http://www.dreamfabric.com/sms/ (Jun. 23, 2007).*

(Continued)

*Primary Examiner* — Kashif Siddiqui
(74) *Attorney, Agent, or Firm* — Westman, Champlin & Kelly, P.A.

(57) ABSTRACT

The present system includes a bridge (or adapter) that connects two synchronization endpoints over two different networks. The bridge first receives information to be synchronized and generates metadata to form it into messages transported over the first network according to a first protocol. A gateway receives the messages over the first transport mechanism and generates a synchronization feed that can be transported over the second network according to a second protocol.

19 Claims, 5 Drawing Sheets

(56) References Cited

U.S. PATENT DOCUMENTS

| | | | |
|---|---|---|---|
| 2007/0198633 | A1 | 8/2007 | Thibeault |
| 2008/0004057 | A1 | 1/2008 | Tarleton et al. |
| 2008/0021963 | A1 | 1/2008 | Jana et al. |
| 2010/0137010 | A1* | 6/2010 | Counts et al. ............ 455/466 |

FOREIGN PATENT DOCUMENTS

| | | |
|---|---|---|
| JP | 2007-516629 | 6/2007 |
| WO | 2006040560 A1 | 4/2006 |
| WO | 20070142765 A1 | 12/2007 |

OTHER PUBLICATIONS

PCT/US2009/048714 International Search Report and Written Opinion mailed Jan. 19, 2010.

Thorstensen et al., "Electronic Shepherd—A Low-Cost, Low-Bandwidth, Wireless Network System", Proceedings of the 2nd international conference on Mobile systems, applications, and services, MobiSys'04, Jun. 6-9, 2004, Boston, Massachusetts, USA., pp. 245-255, Publisher: ACM New York, NY, USA.

Yoneki et al., "Gateway:A Message Hub with Store-and-forward Messaging in Mobile Networks", Proceedings of the 23 rd International Conference on Distributed Computing Systems Workshops (ICDCSW'03), Publication Date: May 19-22, 2003, pp. 348-353.

Peersman et al., "The Global System for Mobile Communications Short Message Service", IEEE Personal Communications, Jun. 2000, pp. 15-23.

Rao et al., "iSMS: An Integration Platform for Short Message Service and IP Networks", IEEE Network, Mar./Apr. 2001, pp. 48-55.

PCT/US2009/048714 Search Report and Written Opinion mailed Jan. 19, 2010. 11 pages.

First Chinese Office Action (with English translation) for Chinese Application No. 200980124942.8, dated Jan. 14, 2013, 11 pages.

Office Action dated Jan. 17, 2013 in related Japanese Serial No. 2011-516678, filed Jun. 25, 2009, 5 pgs. English translation included.

Supplementary European Search Report for PCT Application No. PCT/US2009/08714, dated Apr. 20, 2012, 12 pages.

\* cited by examiner

ADAPTER FOR SYNCHRONIZING DATA OVER DIFFERENT NETWORKS

BACKGROUND

Synchronization of data between applications has been performed in the past. A number of difficulties must be addressed in performing such synchronization. For instance, applications may reside on systems that have different types of connections to a network. The particular idiosyncrasies of a given network can be impediments to generating a general synchronization system that operates across various networks with various applications.

One type of system currently in use for synchronizing data uses a family of web feed formats that are used to publish frequently updated content, such as web blog entries, news headlines, pod casts, etc. This family of web feed formats is referred to as "Really Simple Syndication" (RSS) formats. Such systems may also use a similar format referred to as the "ATOM feed formats". Data that can be transmitted using RSS or ATOM feed formats is typically transmitted when a user subscribes to a given feed. A reader on the user's system checks a user's subscribed links for new content and downloads any updates to the content desired by the user.

The discussion above is merely provided for general background information and is not intended to be used as an aid in determining the scope of the claimed subject matter.

SUMMARY

Simple sharing extensions (also known as FeedSync) are extensions to RSS and ATOM feed formats that enable the aggregation of information by using a variety of data sources. These extensions provide a way to synchronize data across a mesh of endpoints using the RSS or ATOM feed formats.

Typical, current, implementation of this type of synchronization requires a continuous and high speed network connection between endpoints. For instance, in some current implementations of this type of synchronization system, a client node regularly polls a server node to ask for updates to the feed. The client node also sends its own local changes back to the server so that those changes can be published to other endpoints. The nodes are connected over a high speed network that is continuously connected. In this type of implementation, a developer typically does not need to be concerned with the size of the data communicated between the client and server on each request for publication. Nor does the developer need to be concerned with the overall size of the data set being synchronized. These types of networks are simply robust enough so that they can easily handle typical data sets.

However, it may be desirable to synchronize data even in implementations which have a much less capable network. Examples of this type of network are cellular telephone short message service (SMS) networks. SMS defines a communication protocol for sending messages of up to 160 characters to or from mobile handsets that operate on a global system from mobile communications (GSM), in which GSM specifies the standard for the mobile communications.

In such a scenario, both the per-request data size and over all data set size pose serious concerns. As mentioned above, SMS messages are limited to approximately 160 characters per message and are transmitted relatively slowly. Also, the messages are commonly sent but never received.

Therefore, the present system includes a bridge (or adapter) that connects two synchronization endpoints over two different networks. The bridge first receives information to be synchronized and generates metadata to form it into messages transported over the first network according to a first protocol. A gateway receives the messages over the first transport mechanism and generates a synchronization feed that can be transported over the second network according to a second protocol. In one embodiment, the first transport mechanism transports SMS messages and the second transport mechanism comprises a synchronization feed provided over a network that uses the hypertext transport protocol (HTTP).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
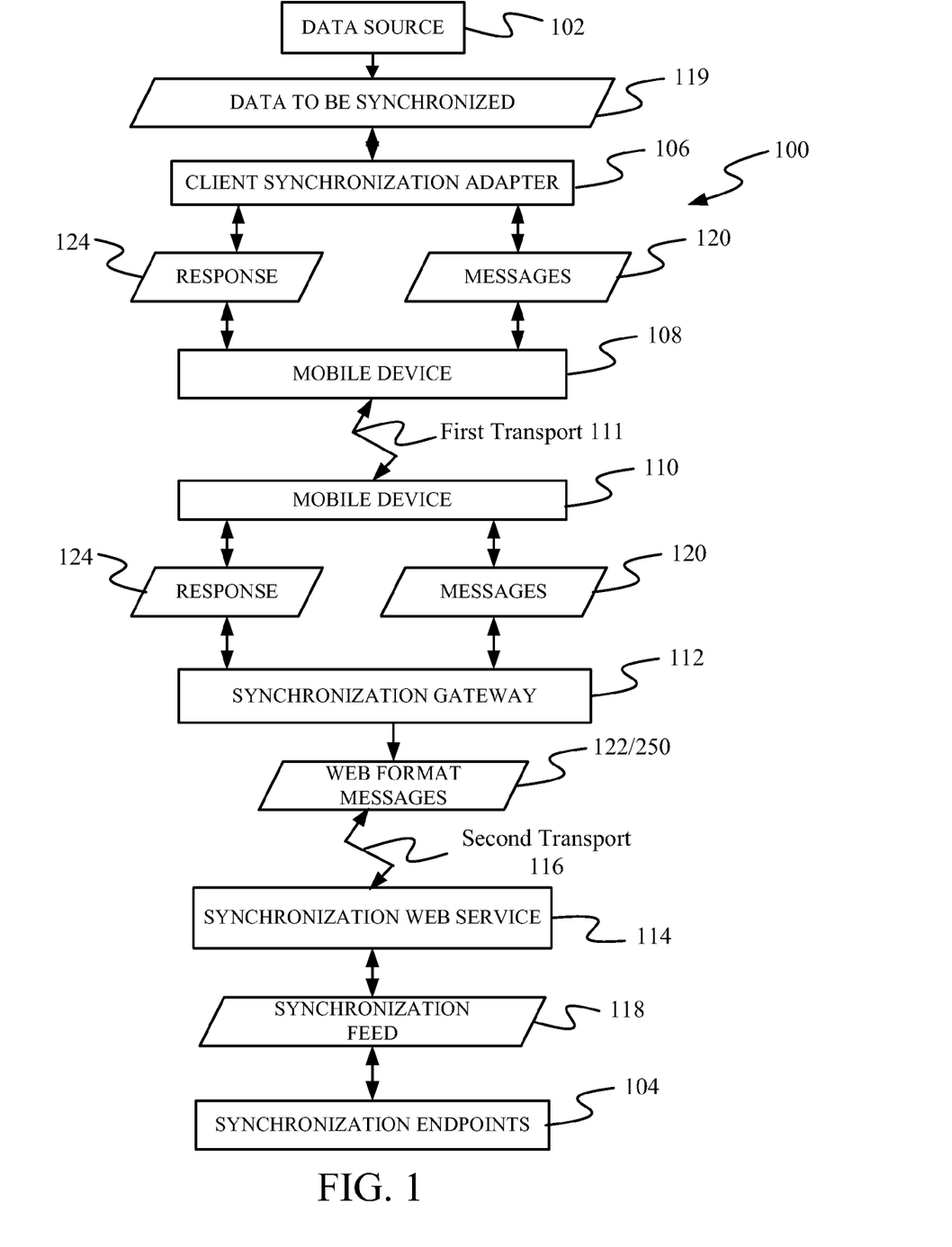
FIG. 1 is a block diagram of one illustrative communication system.

FIG. 1 is a block diagram of one illustrative synchronization system 100. System 100 synchronizes data from data source 102 to synchronization end points 104. System 100 includes synchronization adapter 106, mobile device 108, mobile device 110 connected to mobile device 108 across a first transport 111, synchronization gateway 112, and synchronization web service 114 that is connected to gateway 112 across a second transport 116.

In the embodiment shown in FIG. 1, data source 102 may illustratively be any desired application that has application data that is to be synchronized with data at one or more synchronization endpoints 104. In the embodiment shown in FIG. 1, for instance, data source 102 may be a database application.

Also, in the embodiment shown in FIG. 1, mobile devices 108 and 110 communicate with one another along first transport 111. First transport 111 may illustratively be a low speed link, such as short message service (SMS) link. SMS link 111 does not support a synchronization format, such as the RSS or ATOM feed formats. Therefore, in the embodiment shown in FIG. 1, synchronization adapter 106 receives the data to be synchronized from data source 102 and converts it into short messages that can be sent by mobile device 108 using first transport 111.

The messages are received by mobile device 110 and provided to synchronization gateway 112. Second transport 116, in the embodiment shown in FIG. 1, is a transport that supports synchronization formats. For instance, second transport 116 may illustratively be a transport that communicates using the hypertext transfer protocol (HTTP). This is a relatively fast and robust network relative to the network upon which first transport 111 is implemented. Therefore, synchronization gateway 112 receives the short messages from mobile device 110 and generates the necessary metadata to place the messages in a synchronization format so that they can be transferred over second transport 116, using the synchronization format, to synchronization web service 114.

In one embodiment, synchronization web service 114 accepts messages with simple sharing extensions over the continuous, high speed transport 116 and generates a synchronization feed 118 which is published, according to a desired synchronization format (such as RSS or ATOM feed format) to a mesh of endpoints 104.

Figure 2:
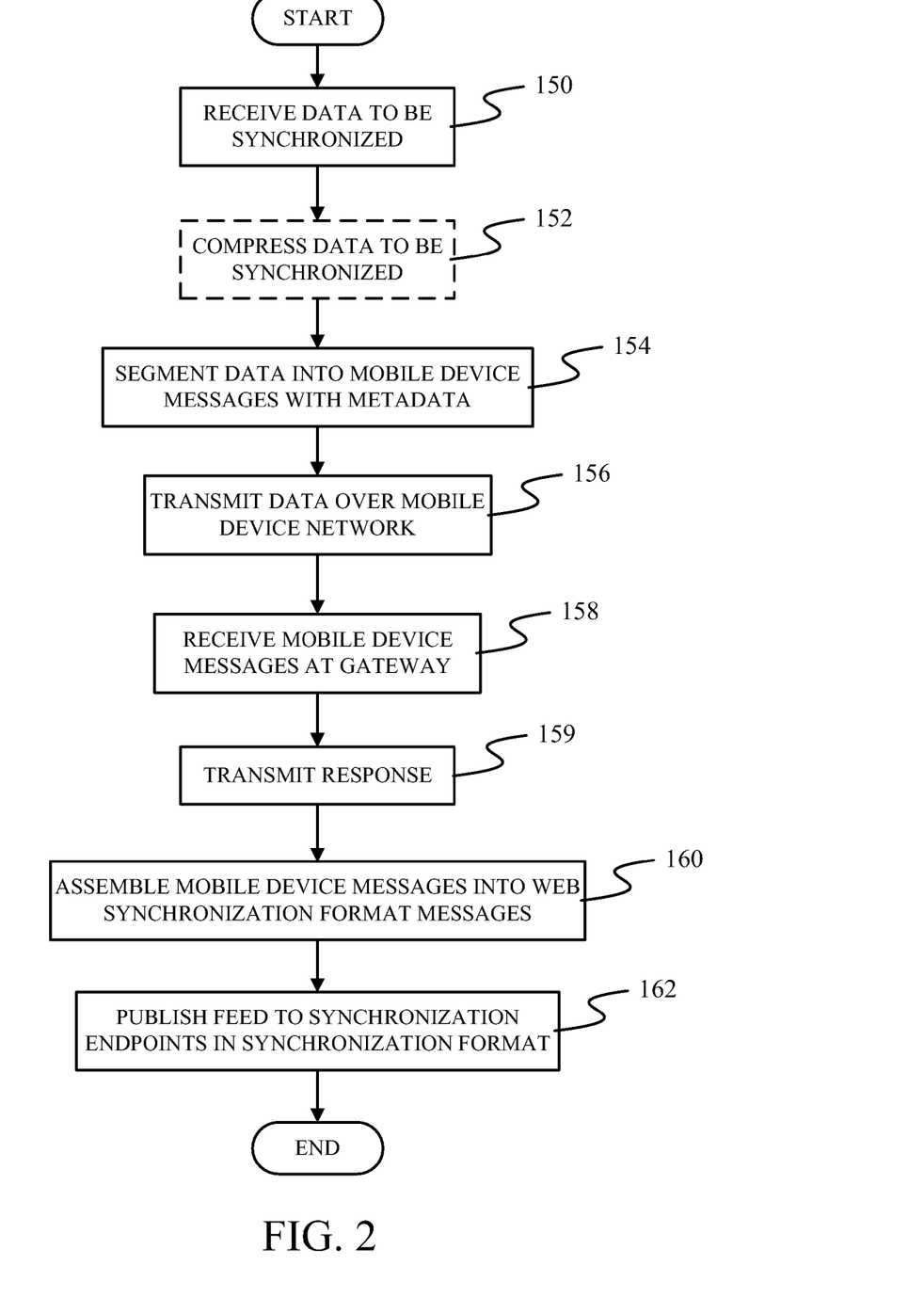
FIG. 2 is a flow diagram illustrating one embodiment of the system shown in FIG. 1.

FIG. 2 is a flow diagram illustrating, in more detail, the overall operation of system 100 shown in FIG. 1. FIGS. 1 and 2 will now be described together. However, prior to describing FIGS. 1 and 2, it will be noted that synchronization adapter 106 and synchronization gateway 112 can be configured to transfer data to be synchronized from data source 102 to synchronization endpoints 104 over any relatively low speed, fragile, first transport 111. That is, there are a number of very low bandwidth and high latency channels for which the present system can be used. SMS is one, but another example of such a transport mechanism is the channel over which ham radio transmissions are sent. The description regarding SMS is exemplary only.

In any case, synchronization adapter 106 first receives the data to be synchronized from a data source 102. As discussed above, data source 102 can be any application that has application data which is to be synchronized with data at synchronization endpoints 104. Receiving the data to be synchronized at adapter 106 is indicated by block 150 in FIG. 2.

Either synchronization adapter 106 or another, separate component, can then optionally compress the data to be synchronized. Since the first transport 111 is a relatively low bandwidth, high latency transport, it can be beneficial to reduce the amount of data sent over first transport 111, so that the data to be synchronized can actually arrive at synchronization endpoints 104 more quickly. Compression of the data to be synchronized is indicated by block 152 in FIG. 2.

It should also be noted that adapter 106 can receive the data to be synchronized from application 102 in a variety of different ways. Application 102 can push any new data that has been changed, and is therefore in need of synchronization, to synchronization adapter 106, or adapter 106 can poll data source 102 for new data. The data to be synchronized is indicated by block 119 in FIG. 1.

The data can be marked with a time stamp, so that when synchronization adapter 106 looks for new data, it can retrieve only the data that has a time stamp which exceeds the time stamp of the most recent synchronization operation. Alternatively, of course, each item of data to be synchronized can be associated with an ever increasing value, which increases every time a change is made to that item. Adapter 106 can then check the values associated with each of the items to be synchronized, to see if they have increased since the last synchronization operation. A variety of other ways for determining whether data has changed in data source 102, and is thus in need of synchronization, can be used as well. Those described are used by way of example only.

Once synchronization adapter 106 has obtained data items that are to be synchronized to endpoints 104, synchronization adapter 106 then segments the data into appropriate data packets for transmission by device 108 over first transport 111. In the embodiment in which device 108 is a cellular telephone and transport 111 is an SMS transport, adapter 106 segments the data received from data source 102 into short messages (of up to 160 characters) and generates the necessary metadata for transmission over first transport 111. The metadata may include, for example, header information, checksum information, or any other desired metadata describing the messages generated by adapter 106. The messages are indicated by block 120 in FIG. 1. Segmenting the data into, in this embodiment, mobile device messages along with generating the metadata is indicated by block 154 in FIG. 2.

Messages 120 are then provided to mobile device 108 and are transmitted by mobile device 108 over first transport 111. This is indicated by block 156 in FIG. 2.

The messages 120 are received over transport 111 at mobile device 110, which provides them to synchronization gateway 112. Receiving the mobile device messages at gateway 112 is indicated by block 158 in FIG. 2.

Gateway 112 then assembles messages 120 into a proper format for transmission over second transport 116. In the embodiment shown in FIG. 1, second transport 116 operates using HTTP. For instance, synchronization gateway 112 illustratively formats the data in messages 120 into an RSS format, which is a family of web feed formats used to publish frequently updated content. Alternatively, gateway 112 can place the data from messages 120 into an ATOM feed format which is also a format used to published frequently updated content. These formats are given by way of example, and other web synchronization formats can be used as well. Assembling the mobile device messages 120 into web synchronization format messages is indicated by block 160 in FIG. 2. The web synchronization format messages are indicated by block 122 in FIG. 1.

Synchronization gateway 112 also illustratively checks to make sure all of messages 120 that are sent from synchronization adapter 106 as part of the data to be synchronized are received before it begins formatting them into web format messages 122. It is common in transport mechanisms such as first transport 111 that some messages, or portions of messages, may be lost during transmission, and never received by the target system. Therefore, it may be that the messages must be re-transmitted before complete web format messages 122 can be prepared. In such a case, synchronization gateway 112 illustratively waits until all of the data to be synchronized is received, before incurring the processing overhead necessary to generate the web format messages 122.

Once all of the messages are received, synchronization gateway 112 illustratively generates response 124 in a message format that can be transmitted by device 110 over first transport 111. The response indicates to adapter 106 that all messages have been received. Transmitting the response is indicated by block 159 in FIG. 2.

The web synchronization format messages 122 are provided to synchronization web service 114. Web synchronization format messages 122 may illustratively be formatted with simple sharing extensions so that they can be synchronized across a mesh of endpoints 104 using RSS or ATOM feeds. Because second transport 116 is a relatively high speed, continuous network, web synchronization format messages 122 can be sent using these formats.

Synchronization web service 114 then publishes the web synchronization format messages 122 as synchronization feeds 118 to synchronization endpoints 104. This is indicated by block 162 in FIG. 2.

Figure 3:
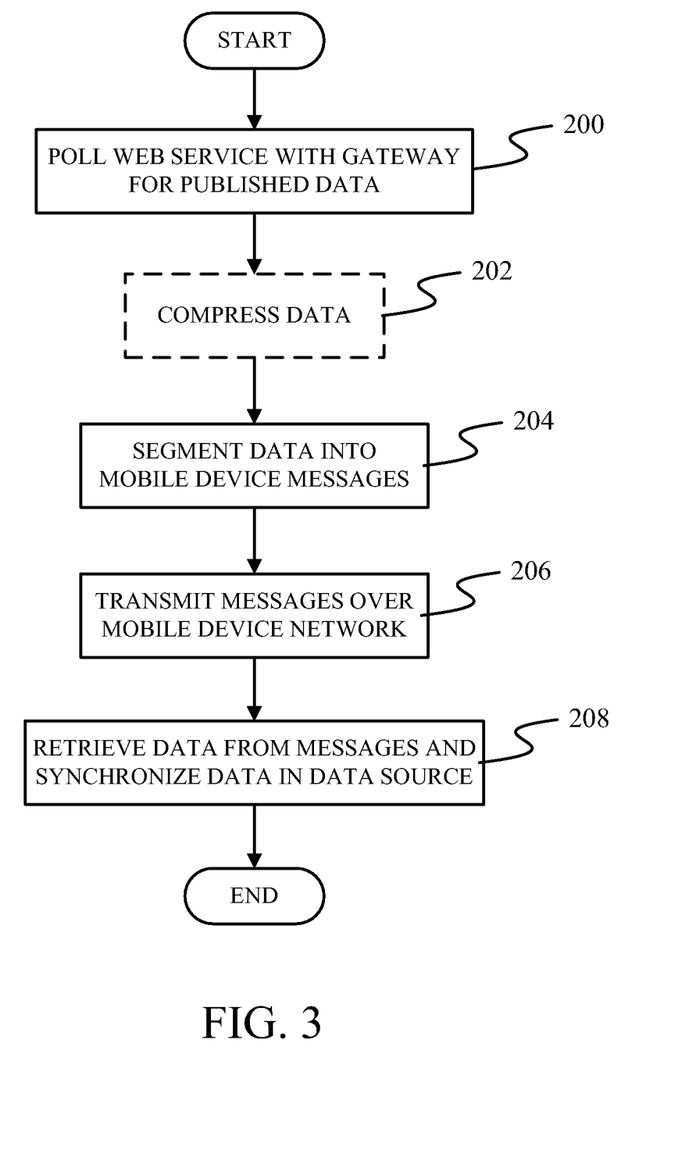
FIG. 3 is a flow diagram illustrating another embodiment of the operation of the system shown in FIG. 1.

FIG. 3 is a flow diagram illustrating the operation of system 100, shown in FIG. 1, in synchronizing data that has changed at one of synchronization endpoints 104, with data in data source 102 over the two different transports 111 and 116. In performing this type of synchronization, synchronization gateway 112 illustratively polls synchronization web service 114 for any data that has been published by one of synchronization endpoints 104, and is to be synchronized with data at data source 102.

The same, or different, techniques can be used by gateway 112 to determine whether there is any new data to be synchronized as those described above with respect to synchronization adapter 106. For instance, synchronization gateway 112 may keep a time stamp associated with its most recent synchronization operation. Then, when it polls web service 114, synchronization gateway 112 disregards all changes that have been made prior to its most recent synchronization operation, and looks only for changes that have been made since then. When synchronization gateway 112 operates with a plurality of different synchronization adapters 106, it illustratively keeps track of the most recent synchronization operation performed for each adapter 106. It may be, for instance, that synchronization gateway 112 serves a plurality of different synchronization adapters 106, each associated with one or more different data sources 102. In that case, synchronization gateway 112 keeps track of the most recent synchronization operations performed for each adapter 106.

Other mechanisms for determining whether data published by synchronization endpoints 104 needs to be synchronized to data source 102 can be used as well. For instance, each synchronization adapter 106 can be queried by gateway 112 to determine when its last synchronization operation was performed. That way, gateway 112 need not keep track of this information for each client, but the client adapter itself can keep track of this information.

Further, each data item to be synchronized with endpoints 104 can have its own time stamp indicating the last time it was changed. Gateway 112 can then check the time stamp on each data item published by synchronization web service 114 for synchronization, in order to determine whether a synchronization operation has been performed since that data item was last changed. All of these techniques for identifying which data items need to be synchronized are described by way of example only, and others could be used as well.

In any case, synchronization gateway 112 determines whether synchronization web service 114 is publishing any data that needs to be synchronized to the client synchronization adapters 106 with which synchronization gateway 112 operates. This is indicated by block 200 in FIG. 3, and the data to be synchronized is indicated by web format messages block 122 in FIG. 1.

If such data does exist, then synchronization gateway 112 (or another device) can optionally compress data in messages 122 so that the amount of data transmitted over slow, low latency transport 111 is minimized, or at least reduced to some extent. Compression of the data is indicated by block 202 in FIG. 3.

Gateway 112 then segments the data 250 to be synchronized into messages 120 that can be transmitted over transport 111 by mobile device 110. As described above with respect to client synchronization adapter 106, where transport 111 is an SMS transport, then the data 250 to be synchronized is segmented into SMS messages of no more than 160 characters, and gateway 112 also generates the necessary metadata (such as header and checksum data) used by the SMS transport. Segmenting the data into mobile device messages is indicated by block 204 in FIG. 3.

The messages 120 are then provided to mobile device 110, where they are transmitted over first transport 111 to mobile device 108. Mobile device 108 then provides messages 120 to client synchronization adapter 106. Transmitting the messages over the first transport (e.g., mobile device network) 111 is indicated by block 206 in FIG. 3.

Client synchronization adapter 106 then prepares the data in messages 120 so that it can be synchronized with corresponding data in data source 102. For instance, where data source 102 is a particular application that expects data in a particular format, adapter 106 assembles the data contained in messages 120 into the format desired by data source 102. The data to be synchronized 119, in the proper format, is then provided to data source 102 where it is synchronized with the corresponding data items in data source 102. Retrieving the data from messages 120 and synchronizing the data in data source 102 is indicated by block 208 in FIG. 3.

Figure 4:
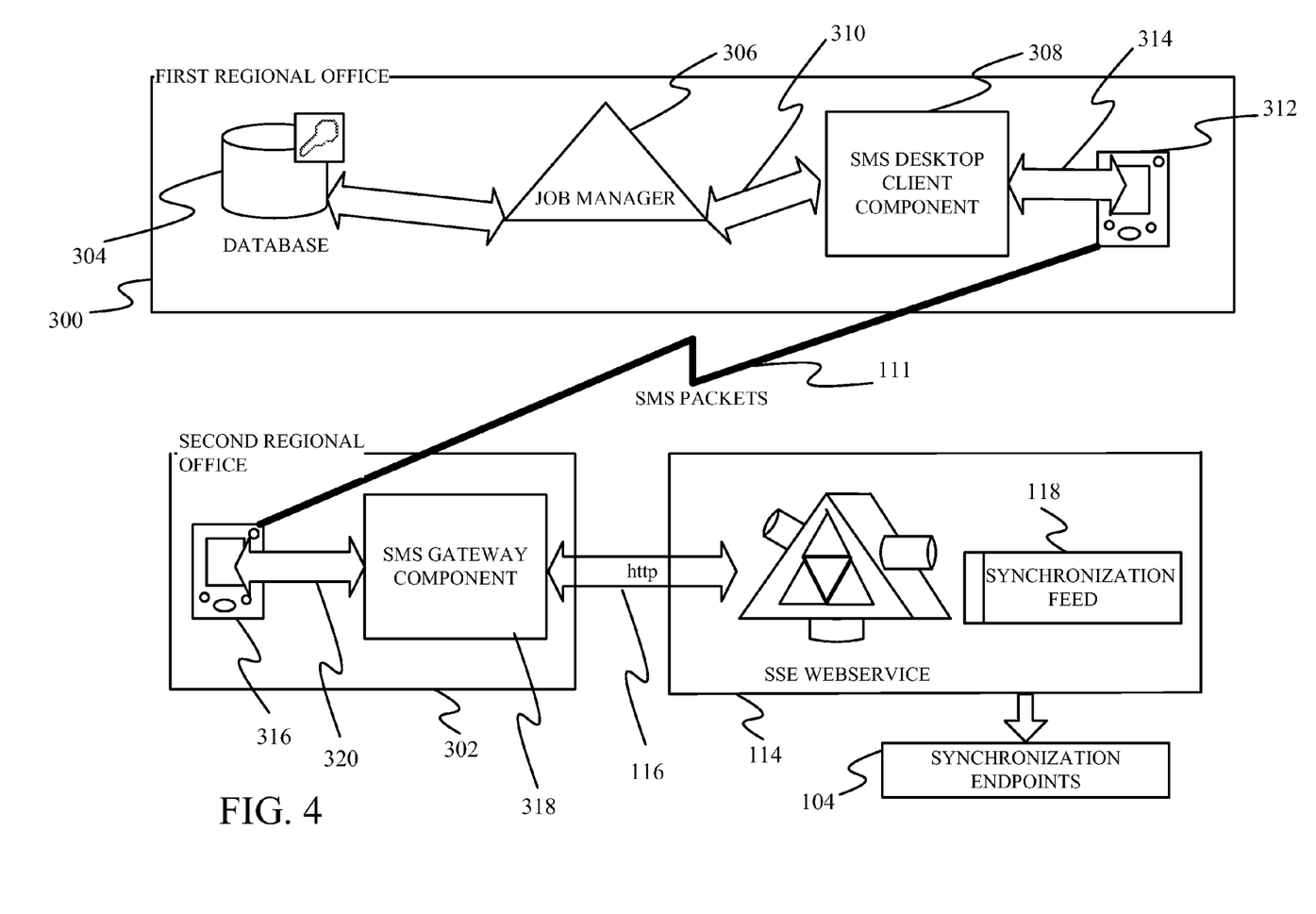
FIG. 4 is a more detailed embodiment of a communication system.

FIG. 4 is a more detailed block diagram of one illustrative embodiment of a system 100 for synchronizing data over two different data transports, one being a relatively low speed, low latency transport 111 and the other being a high speed, continuous transport 116. FIG. 4 shows an embodiment in which data from a first regional office 300 of a company is to be transmitted to a second regional office 302 over the low latency transport 111. The data is then to be prepared for transmission over the high frequency transport 116 and provided to web service 114 for publication to a plurality of synchronization endpoints 104.

FIG. 4 shows that data source 102 can be a database application 304 that is accessed by a job manager component 306. Job manager component 306 interacts with database application 304, retrieving data from database application 304 and writing data to database application 304, and generally maintaining data in database application 304. In the embodiment shown in FIG. 4, client synchronization adapter 106 is implemented as an SMS desktop client component 308. SMS desktop client component 308 is illustratively coupled to job manager 306 using APIs or any other interface exposed by job manager 306 indicated by arrow 310 in FIG. 4. The embodiment shown in FIG. 4 also shows that mobile device 108 is illustratively implemented as a personal digital assistant 312 which can be connected to SMS desktop client component 308 using a USB connection 314 for example. Mobile device 110 is also implemented, in the embodiment shown in FIG. 4, as a personal digital assistant 316. Mobile devices 312 and 316 are shown in FIG. 4 as personal digital assistants, including a mobile telephone, and communicate with one another over transport 111, by sending SMS packets over transport 111.

FIG. 4 also shows that, in one embodiment, synchronization gateway 112 is implemented as an SMS gateway component 318 that is connected to mobile device 316 using, for example, a USB connection 320.

FIG. 4 also shows that synchronization web service 114 can use simple sharing extensions to generate synchronization feeds 118 and publish them to synchronization endpoints 104.

Thus, SMS desktop client component 308 is configured to receive data to be synchronized through job manager 306, from database application 304, and to form that data into SMS packets that are transmitted to client 312 over USB connection 314. SMS desktop client component 308 is also configured to receive SMS packets over USB connection 314 and provide them in a desired format to job manager 306 for synchronization with data in database application 304.

SMS gateway component 318 is configured to receive SMS packets transmitted to mobile device 316, and forwarded to SMS gateway component 318 over USB connection 320. SMS gateway component 318 is also configured to generate messages in a web feed format for transmission over HTTP link 116 to synchronization web service 114 which generates synchronization feeds 118 for publication to synchronization endpoints 104. Similarly, SMS gateway component 318 can operate in the reverse direction, receiving synchronization feeds 118 over HTTP link 116, and generating, from those feeds, SMS packets for transmission over link 320 to mobile device 316, where they are further transmitted to mobile device 312 over SMS link 111.

It can thus be seen that the present system provides for synchronization of data from applications over even a very slow transport 111, such as a SMS network. The data is then prepared in a web feed format for synchronization using a high speed transport 116. Of course, once it is prepared using a web feed format, it can be synchronized with a mesh of synchronization endpoints 104. Components 106 and 112 thus act as a bridge that connects two endpoints 102 and 104, using a web feed format, even though the endpoints are separated by a relatively slow network where it may be quite difficult to use a web feed format.

It will also be recognized, of course, that adapter 106 can be directly implemented within mobile device 108 and gateway 112 can be directly implemented within mobile device 110. Similarly, mobile devices 108 and 110 can also contain both adapter 106 and gateway 112. Further, mobile device 316 can include component 304, 306 and 310. Therefore, even though those components are shown separately in FIGS. 1 and 4, they need not actually be separate components or devices.

Figure 5:
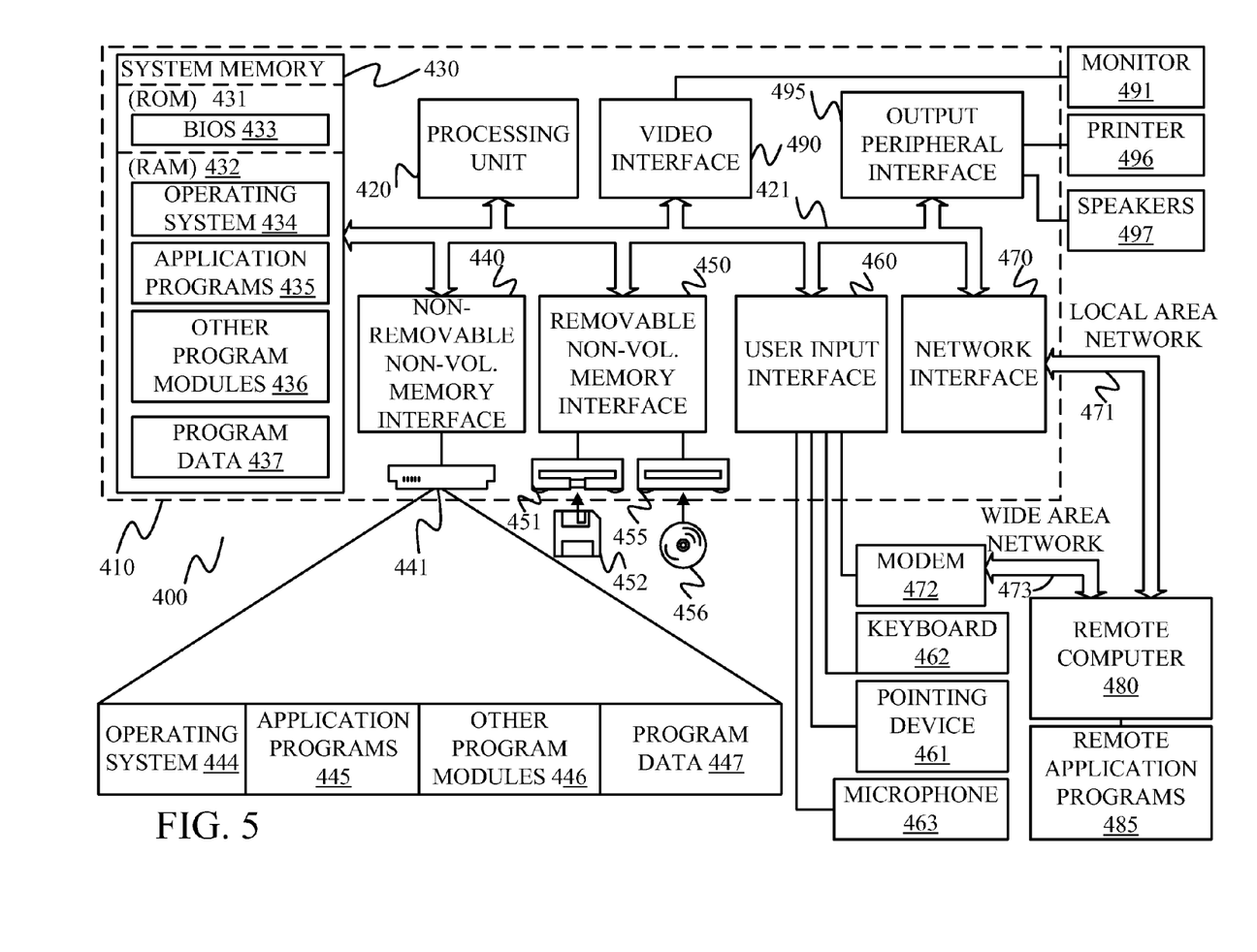
FIG. 5 is a block diagram of one illustrative computing environment.

FIG. 5 illustrates an example of a suitable computing system environment 400 on which the invention may be implemented. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 5, an exemplary system for implementing the invention includes a general purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 5 illustrates operating system 434, application programs 435, other program modules 436, and program data 437.

The computer 410 may also include other removable/non-removable volatile/nonvolatile computer storage media. By way of example only, FIG. 5 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 5, provide storage of computer readable instructions, data structures, program modules and other data for the computer 410. In FIG. 5, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies. Various portions of system 100 can be stored in modules 446, programs 445 or elsewhere, including remotely.

A user may enter commands and information into the computer 410 through input devices such as a keyboard 462, a microphone 463, and a pointing device 461, such as a mouse, trackball or touch pad. Other input devices (not shown) may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 may operate in a networked environment using logical connections to one or more remote computers, such as a remote computer 480. The remote computer 480 may be a personal computer, a hand-held device, a server, a router, a network PC, a peer device or other common network node, and typically includes many or all of the elements described above relative to the computer 410. The logical connections depicted in FIG. 5 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 5 illustrates remote application programs 485 as residing on remote computer 480. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of synchronizing data among a plurality of applications on a plurality of different synchronization endpoints, the method comprising:
    receiving a plurality of messages at a first cellular mobile device, the plurality of messages being received from a second cellular device over a first network transport mechanism that transports messages according to a cellular telephone messaging protocol, the plurality of messages containing data to be synchronized from a first application on a first synchronization endpoint;
    verifying that all of the plurality of messages containing the data have been received;
    assembling the data to be synchronized at the first cellular mobile device verification that all of the plurality of messages have been received, wherein assembling comprises using a synchronization gateway on the first cellular mobile device to assemble the data into a synchronization feed according to a web feed format for transmission over a web transport mechanism that transports data using the web feed format, different from the cellular telephone messaging protocol; and
    transmitting the assembled data from the first cellular mobile device to a publishing component that publishes the synchronization feed over the web transport mechanism using the web feed format to a second synchronization endpoint that includes a second application.

2. The method of claim 1 wherein the first network transport mechanism comprises:
    a short message service transport mechanism and wherein receiving messages at the first mobile device comprises receiving short messages of no more than one hundred sixty characters, and generated metadata corresponding to the short messages.

3. The method of claim 2 wherein assembling the data into a synchronization feed according to a web feed format comprises:
    assembling the data, at the first mobile device, into the web feed format for transmission over the web transport mechanism that transmits data according to a hypertext transport protocol.

4. The method of claim 2 wherein receiving messages comprises:
    receiving the messages over the short message service transport mechanism in compressed form.

5. The method of claim 1 wherein receiving messages comprises:
    receiving additional data from a synchronization web service that transmits data over the web transport mechanism for synchronization from a plurality of different synchronization endpoints.

6. A synchronization system for synchronizing data among a plurality of different synchronization endpoints, the system comprising:
    a first cellular mobile device configured to:
        receive messages transmitted over a web transport mechanism from a first synchronization endpoint for synchronization with the plurality of different synchronization endpoints, the messages containing the data to be synchronized and being received at the first cellular mobile device over the web transport mechanism according to a web feed format, the first cellular mobile device including a synchronization adapter that receives the data to be synchronized from an application at the first synchronization endpoint, convert the messages from the web feed format to a first set of short message service (SMS) messages according to an SMS protocol using the synchronization adapter, transmit the first set of SMS messages over a cellular link;

receive a second set of SMS message over the cellular link, convert the second set of SMS messages into a first synchronization feed according to the web feed format using the synchronization adapter, provide the first synchronization feed to the application, and a second cellular mobile device including a synchronization gateway component, the second cellular mobile device configured to:

receive the first set of SMS messages, generate a second synchronization feed using the gateway component according to a second protocol, different from the SMS protocol, that contains the data to be synchronized, for transmission over a web transport mechanism, and publish the second synchronization feed to the plurality of different synchronization endpoints by transmitting the second synchronization feed over the web transport mechanism, transmit the second set of SMS messages to the first cellular mobile device over the cellular link.

7. The synchronization system of claim 6 and further comprising:

a second cellular mobile device coupled to the first cellular mobile device and configured to receive the SMS messages and transmit them to the gateway component.

8. The synchronization system of claim 7 wherein the first and second cellular mobile devices comprise first and second cellular telephones.

9. The synchronization system of claim 8 wherein the second cellular telephone includes the gateway component.

10. The synchronization system of claim 6 and further comprising:

a web service component, coupled to the gateway, configured to publish the synchronization feed to the synchronization endpoints.

11. A method of synchronizing data among a plurality of applications, the method comprising:

receiving, at a synchronization adapter disposed on a first cellular mobile device, data to be synchronized from a first application deployed on a first synchronization endpoint, the data being received as a synchronization feed according to a web feed format;

assembling, on the first cellular mobile device, the data received according to the web feed format into a first set of small message service (SMS) messages for transmission over a SMS transport mechanism, the data being assembled on the first cellular mobile device by generating metadata corresponding to the SMS messages;

transmitting the SMS messages, using the first cellular mobile device, over the SMS transport mechanism that transports messages according to an SMS protocol, containing data to be synchronized from the first application along with the metadata generated by the first cellular mobile device; and receiving, at the first cellular mobile device, a second set of SMS messages over the SMS transport mechanism;

assembling, using the synchronization adapter disposed on the first cellular mobile device, the second set of SMS messages into a second synchronization feed according to the web feed format; and providing the second synchronization feed to at least one application deployed on the first synchronization endpoint.

12. The method of claim 11 and further comprising:

receiving the first set of SMS messages at a second mobile device that is disparately located from the first mobile device over the SMS transport mechanism;

assembling the data to be synchronized in the first set of SMS message into a third synchronization feed according to the web feed format for transmission over a web transport mechanism that transports data using a hypertext transfer protocol; and publishing the third synchronization feed over the web transport mechanism to a second synchronization endpoint that includes a second application.

13. The method of claim 11, wherein receiving the data to be synchronized from a first application comprises:

using the synchronization adapter on the first cellular mobile device to poll the first application deployed on the first synchronization endpoint.

14. The method of claim 1, wherein the publishing component comprises a synchronization web service that transmits synchronization feeds to a plurality of synchronization endpoints.

15. The method of claim 14, and further comprising:

using the synchronization gateway to poll the synchronization web service and identify data to be synchronized with data at the first synchronization end points.

16. The method of claim 15, wherein the synchronization gateway maintains a time stamp associated with a most recent synchronization operation.

17. The method of claim 16, wherein the synchronization gateway utilizes the time stamp when polling the synchronization web service.

18. The method of claim 17, wherein the synchronization gateway disregards changes made prior to the most recent synchronization operation.

19. The method of claim 16, wherein the synchronization gateway maintains a time stamp for each of a plurality of different synchronization adapters.

* * * * *